(No Model.)
G. J. FROST.
ANIMAL TRAP.
No. 459,163. Patented Sept. 8, 1891.
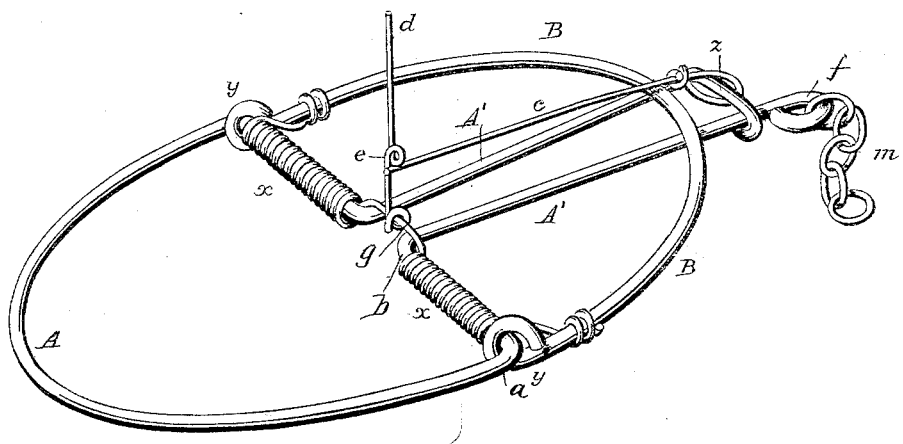
Witnesses.
Inventor,
George J. Frost
per James Sheehy
Attorney

UNITED STATES PATENT OFFICE.

GEORGE JAMES FROST, OF TORONTO, CANADA.

ANIMAL-TRAP.

SPECIFICATION forming part of Letters Patent No. 459,163, dated September 8, 1891.

Application filed February 9, 1891. Serial No. 380,804. (No model.)

*To all whom it may concern:*

Be it known that I, GEORGE JAMES FROST, a citizen of Canada, residing at Toronto, in the Province of Ontario and Dominion of Canada, have invented certain new and useful Improvements in Rat-Traps; and I do declare the following to be a full, clear, and exact description of the invention, such as will enable others skilled in the art to which it appertains to make and use the same.

This invention has relation to an improvement in that class of animal-traps known as "jaw-traps;" and it has for its object to kill the rodent by impaling him with one of the jaws or loops, the opposite one remaining fixed or stationary, so as to give greater force to the blow of the movable jaw.

The invention is illustrated in the accompanying drawing by a perspective view, the trap being shown in a set position.

In carrying out the invention I take a piece of wire of sufficient stoutness and bend the same about midway of its length to form a loop or jaw A, which I shall call the "fixed" or "stationary" jaw. After forming this loop or jaw A the ends are bent in opposite directions from the points $a$ in a transverse plane to form the cross-branches $b$, and from the inner ends of said branches $b$ the wire is carried horizontally and longitudinally in a position approximately parallel to each other, as shown at A'. One of these branches A' terminates in a suitable eye $f$ for the attachment of a chain $m$ or the like, whereby the whole device may be attached or anchored to the ground or other place, while the opposite branch A' has its end carried transversely, as shown at $z$, and looped over the branch having the eye $m$, so as to secure the two branches at this point and provide a means of attachment for the trigger, as will be presently explained.

B indicates the impaling branch or movable jaw. This jaw is also formed from stout wire and has an eye $y$ turned in each end where it is connected in a hinged manner to the branches $b$ of the stationary jaw A. This hinge is provided with a spring which is designed to give sufficient force to the throw of the jaw A to kill the rodent as he attempts to remove the bait from the trigger which is placed in the middle of the trap.

In arranging the spring I take a piece of spring-wire and form two coils $xx$, which are connected at one end by a straight integral branch $g$, with the coils placed over the transverse branches $b$ of the main frame, and then secure both ends of the spring to the movable jaw B, as shown at $h$.

$d$ indicates the bait-holder. This holder is also composed of wire, and is loosely hinged at one end on the connecting branch $g$ of the spring, and is looped at a suitable point in its length to form a shoulder $e$.

$c$ indicates the trigger, which is journaled at one end of the branch $z$ of one of the arms A', and its opposite end is designed to engage the shoulder $e$ of the trigger, as shown.

The trap is illustrated in an operative position, and it will be seen that when a rat or other rodent attempts to remove a bait from the holder $d$ he will necessarily be within the range of the jaw B, which closes upon the jaw A, and as he disengages the trigger from the shoulder $e$ of the holder $d$ the jaw B will be released, and the spring, being allowed to act with its full force, will impale the animal and kill him without drawing blood, thus obviating the objection so often experienced in jaw-traps and other traps of a similar character.

Having described my invention, what I claim is—

The rodent-trap described, composed of the fixed jaw having the transverse hinge branches and the longitudinal approximately-parallel branches, one of which terminates in an eye or the like and the other having a cross branch for the attachment of a trigger, the movable jaw hinged to the fixed jaw, the spring at the hinge-point of the jaws and having the straight connecting portion, and the bait-holder pivoted on said connecting portion, substantially as specified.

In testimony whereof I affix my signature in presence of two witnesses.

GEORGE JAMES FROST.

Witnesses:
R. J. GIBSON,
F. A. NOTT.